(12) United States Patent
Hayashi et al.

(10) Patent No.: US 12,209,636 B2
(45) Date of Patent: Jan. 28, 2025

(54) BELT AND SYSTEM FOR ACQUIRING BELT STATE INFORMATION

(71) Applicant: Mitsuboshi Belting Ltd., Kobe (JP)

(72) Inventors: Shigehiko Hayashi, Hyogo (JP); Yoshiki Ichikawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 310 days.

(21) Appl. No.: 17/426,345

(22) PCT Filed: Jan. 28, 2020

(86) PCT No.: PCT/JP2020/002877
§ 371 (c)(1),
(2) Date: Jul. 28, 2021

(87) PCT Pub. No.: WO2020/158696
PCT Pub. Date: Aug. 6, 2020

(65) Prior Publication Data
US 2022/0128120 A1     Apr. 28, 2022

(30) Foreign Application Priority Data

Jan. 28, 2019 (JP) .................................. 2019-012409
Jan. 20, 2020 (JP) .................................. 2020-006930

(51) Int. Cl.
*F16G 5/08*     (2006.01)
*F16G 1/10*     (2006.01)
(Continued)

(52) U.S. Cl.
CPC ................. *F16G 5/08* (2013.01); *F16G 1/10* (2013.01); *F16G 5/20* (2013.01); *G01L 1/16* (2013.01);
(Continued)

(58) Field of Classification Search
CPC ..... F16G 5/08; F16G 1/10; F16G 5/20; G01L 1/16
(Continued)

(56) References Cited

U.S. PATENT DOCUMENTS 7,050,017 B2 *   5/2006   King ...................... H01Q 1/325
                                                              343/873
7,595,721 B2 *   9/2009   Shinmura ............. B60C 19/002
                                                              340/447

(Continued)

FOREIGN PATENT DOCUMENTS

CN         101443644 A       5/2009
CN         102203455 A       9/2011
(Continued)

OTHER PUBLICATIONS

Jun. 1, 2022—(CN) Notification of First Office Action—CN App. No. 202080010778.4, Eng. Tran.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

A belt includes a laminate including a back surface layer disposed on a back surface side and a tension member layer including a tension member. The belt includes a sensor provided in the laminate and configured to detect a state of the belt, and a passive RFID also provided in the laminate, including an IC chip and an antenna, and configured to transmit state information on the belt detected by the sensor to an outside.

10 Claims, 9 Drawing Sheets

(51) Int. Cl.
    *F16G 5/20*          (2006.01)
    *G01L 1/16*          (2006.01)
    *G06K 19/07*        (2006.01)
    *G06K 19/077*       (2006.01)
    *H01Q 1/27*          (2006.01)
    *F16G 1/28*          (2006.01)

(52) U.S. Cl.
    CPC ... *G06K 19/0723* (2013.01); *G06K 19/07775* (2013.01); *H01Q 1/273* (2013.01); *F16G 1/28* (2013.01)

(58) Field of Classification Search
    USPC .......................................................... 474/265
    See application file for complete search history.

(56) References Cited

U.S. PATENT DOCUMENTS

| | | |
|---|---|---|
| 8,829,929 B1 | 9/2014 | Watkins, Jr. |
| 9,729,251 B2 * | 8/2017 | Cox .................... H05K 7/20209 |
| 10,152,672 B2 * | 12/2018 | Janko ...................... B29D 30/72 |
| 2004/0159383 A1 * | 8/2004 | Adamson ............ B60C 23/0433 340/447 |
| 2004/0252072 A1 * | 12/2004 | Adamson ............ B60C 23/0493 343/873 |
| 2007/0256485 A1 | 11/2007 | Rensel et al. |
| 2009/0277262 A1 | 11/2009 | Rensel et al. |
| 2009/0303065 A1 | 12/2009 | Lipowski |
| 2011/0083500 A1 | 4/2011 | Rensel et al. |
| 2011/0198402 A1 * | 8/2011 | Tucker ............. G06K 19/07749 235/492 |
| 2011/0218069 A1 | 9/2011 | Nakashima et al. |
| 2012/0323371 A1 * | 12/2012 | Ballhausen ............... F16G 1/28 700/275 |
| 2013/0217528 A1 * | 8/2013 | Matsumoto ............... F16G 1/10 427/407.1 |
| 2017/0254405 A1 * | 9/2017 | Ballhausen ............... F16G 1/10 |
| 2017/0299017 A1 * | 10/2017 | Gregg ....................... F16G 1/04 |
| 2018/0172605 A1 * | 6/2018 | Brunner ................. G01N 22/02 |
| 2018/0223056 A1 * | 8/2018 | Duke, Jr. ............ D06M 15/568 |
| 2018/0313431 A1 * | 11/2018 | McNamee ................ F16G 1/28 |

FOREIGN PATENT DOCUMENTS

| | | | | |
|---|---|---|---|---|
| CN | 202704466 U | | 1/2013 | |
| CN | 105109900 A | | 12/2015 | |
| DE | 102009003732 | * | 10/2010 | |
| DE | 102017206980 A1 | * | 10/2018 | ............. B29C 43/18 |
| EP | 2190695 B1 | | 2/2012 | |
| JP | 2002-195349 A | | 7/2002 | |
| JP | 2009-535699 A | | 10/2009 | |
| JP | 5149681 B2 | | 2/2013 | |
| JP | 2013171428 A | * | 9/2013 | |
| JP | 6727145 B2 | | 6/2015 | |
| JP | 2015-124025 A | | 7/2015 | |
| JP | 2017-049650 A | | 3/2017 | |
| JP | 2017-132292 A | | 8/2017 | |
| JP | 2018109443 A | * | 7/2018 | |
| JP | 6406302 B2 | | 10/2018 | |
| TW | M541059 U | | 5/2017 | |
| WO | 2012-085338 A1 | | 6/2012 | |
| WO | WO-2016177883 A1 | * | 11/2016 | ............. F16G 1/08 |
| WO | 2017-135331 A1 | | 8/2017 | |
| WO | 2018-206660 A1 | | 11/2018 | |
| WO | WO-2019009339 A1 | * | 1/2019 | ............. D02G 3/447 |

OTHER PUBLICATIONS

Mar. 24, 2021—International Search Report—App PCT/JP2020/002877.
Apr. 21, 2021—(JP) Notification of Reasons for Revocation—App 2020-006930.
Oct. 4, 2022—(EP) Extended Search Report—App. 20748999.8.
Kanwar Kelash et al: "Embedded Uhf Rfid tag design process for rubber transmission belt using 3D model", 2014 IEEE RFID Technology and Applications Conference (RFID-TA), IEEE, Sep. 8, 2014 (Sep. 8, 2014), pp. 97-102.
Oct. 15 2024—(EP) Office Action—App 20748999.8.

* cited by examiner

BELT AND SYSTEM FOR ACQUIRING BELT STATE INFORMATION

CROSS REFERENCE TO RELATED APPLICATIONS

This is a U.S. National Phase Application under 35 U.S.C. § 371 of International Application No. PCT/JP2020/002877, filed Jan. 28, 2020, which claims priority to Japanese Application Nos. 2019-012409, filed Jan. 28, 2019, and 2020-006930, filed Jan. 20, 2020, which was published Under PCT Article 21(2), the entire contents of which are incorporated herein by reference.

TECHNICAL FIELD

The present invention relates to a belt having a function of detecting a state of the belt, and a system for acquiring belt state information.

BACKGROUND ART

As disclosed in Patent Literature 1, a power transmission belt is widely used as a power transmission belt for general industries, precision machines, and the like due to an excellent appearance and being less likely to generate wear debris. Such a power transmission belt is wound around pulleys with tension applied to the power transmission belt, and transmits power between the pulleys by running between the pulleys by rotational driving of the pulleys.

When running between the pulleys as described above, the power transmission belt continuously receives various external pressure and internal pressure (external forces and internal forces) such as tension applied to the power transmission belt itself, a propulsive force received due to the rotational driving of the pulleys, and a force that deforms the power transmission belt in a curving shape when the power transmission belt runs on outer circumferences of the pulleys. When being continuously used under such external pressure and internal pressure, the power transmission belt needs replacement due to deterioration by the influence of the pressure applied to the power transmission belt, an increase in the internal temperature due to the pressure, frictional heat, and the like.

In this regard, the external pressure and the internal pressure received by the power transmission belt change when there is aging deterioration or damage accompanying the use of the power transmission belt. For example, due to deterioration or damage of the power transmission belt, the tension applied to the power transmission belt itself weakens, the propulsive force received due to the rotational driving of the pulleys weakens, and the force applied when the power transmission belt runs on the outer circumferences of the pulleys changes. When the external pressure and the internal pressure received by the power transmission belt change, the internal temperature of the power transmission belt also changes.

For another example, Patent Literature 2 discloses an endless transport belt in which a transport object is placed on a surface that is a transport surface, and a back surface is wound around pulleys. Similar to the power transmission belt, the internal pressure and the external pressure received by the transport belt also change due to aging deterioration and damage caused by the use of the belt.

Therefore, it is conceivable to adopt a mechanism that knows a state of a belt, such as the temperature and the pressure applied to the power transmission belt and the transport belt, and determines the replacement time by detecting and observing the state of the belt.

CITATION LIST

Patent Literature

Patent Literature 1: JP-A-2018-109443
Patent Literature 2: JP-A-2015-124025

SUMMARY OF INVENTION

Technical Problem

To transmit state information on the belt detected by a sensor to the outside, it is necessary to dispose a transmitter on the belt together with the sensor. When a battery is employed as a driving power source of the transmitter, the battery needs replacement periodically. The battery cannot be replaced during running of the belt and accordingly, the battery needs to be replaced after the belt is stopped once, which takes time and effort. Further, when the transmitter is embedded in the belt, the battery can be replaced only after the belt is disassembled, making it practically impossible to replace the battery.

Therefore, an object of the present invention is to construct a system that requires no battery in a belt equipped with a sensor that detects a belt state and an RFID that transmits a detection result to the outside.

Solution to Problem

According to an aspect of the present invention, there is provided a belt including: a laminate including a back surface layer disposed on a back surface side and a tension member layer having a tension member. The belt includes a sensor provided in the laminate and configured to detect a state of the belt, and a passive RFID also provided in the laminate, including an IC chip and an antenna, and configured to transmit state information on the belt detected by the sensor to an outside.

According to the above configuration, since the belt includes the passive RFID, it is not necessary to mount a battery on the belt to transmit the state information on the belt detected by the sensor to the outside.

According to the above configuration, it is possible to provide a belt lighter in weight and higher in reliability than a belt on which a battery is mounted. Accordingly, it is possible to prevent a decrease in running performance and durability due to an increase in the weight of the belt and a decrease in bending resistance.

The tension member is preferably a cord, the laminate preferably includes the back surface layer, an inner surface layer disposed on an inner surface side, and a cord layer including the cord embedded between the back surface layer and the inner surface layer, and the belt is preferably a power transmission belt.

According to the above configuration, the state information on the belt detected by the sensor can be transmitted to the outside without mounting a battery on the power transmission belt.

In the belt, the RFID is preferably disposed in the back surface side of the laminate relative to the tension member.

According to the above configuration, pressure is less likely to be directly applied to the RFID as compared with a case where the RFID is disposed in the inner surface side where the laminate frequently comes into contact with a pulley or the like, it is possible to prevent excessive load from being applied to the RFID serving as an electronic device.

In addition, a signal transmitted from the RFID during running of the belt is easier and safer to read from a back side of the belt than from an inner side of the belt. Therefore, according to the above configuration, on the premise that the signal transmitted from the RFID is read from a back surface side of the belt, the intensity of the signal can be improved as compared with a case where the RFID is disposed in the inner surface side of the laminate relative to the cord.

In the belt, the RFID is preferably embedded in the laminate.

According to the above configuration, it is possible to firmly fix the RFID to the belt during belt running, as compared with a case where the RFID is disposed on a surface of the belt. In addition, pressure is less likely to be directly applied to the RFID embedded in the belt as compared with the case where the RFID is disposed on the belt surface that comes into contact with the pulley or the like, and thus a risk of breakage of the RFID can be reduced.

In addition, according to the above configuration, since the RFID is embedded in the belt, strength, elasticity, durability, and the like for ensuring functions as the belt can be maintained without impairing the appearance.

In the belt, the sensor and the RFID are preferably disposed in the same layer of the laminate.

According to the above configuration, the sensor and the RFID are easily connected to each other and the reliability of the connection is improved, as compared with a case where the sensor and the RFID are disposed in different layers of the laminate.

In the belt, the antenna is preferably made of a conductive linear material having a meander line shape.

According to the above configuration, stress applied to the antenna can be dispersed and the antenna is less likely to be damaged.

In the belt, the RFID preferably further includes a connection conductive wire connecting the IC chip and the antenna, the IC chip and the antenna are preferably disposed along a predetermined direction, and the antenna is preferably a dipole antenna made of one conductive linear material and extending from a connection portion connected to the connection conductive wire of the antenna to one side and the other side in a direction orthogonal to the predetermined direction.

Normally, the strength of a part where the IC chip and the antenna are connected is weak. According to the above configuration, the direction in which the IC chip and the antenna are disposed is orthogonal to the direction in which the antenna extends. For this reason, power supply from the antenna to the IC chip through the connection conductive wire is performed in a direction perpendicular to the extending direction of the antenna. This makes it difficult for the stress to be transmitted to the connection portion where the IC chip and the antenna are connected to each other. In addition, since the antenna is a dipole antenna made of one conductive linear material, the stress applied to the antenna is dispersed and the connection portion where the antenna and the IC chip are connected to each other is less likely to be damaged.

In the belt, the IC chip and the antenna are preferably wirelessly connected by electromagnetic coupling.

According to the above configuration, the strength of the RFID as a whole is improved and the RFID is less likely to be damaged as compared with a case where the IC chip and the antenna are connected by wires.

In the belt, the antenna is preferably made of a conductive linear material having TEFLON (registered trademark) powder carried on a surface thereof.

According to the above configuration, it is possible to weaken the interaction between the antenna and the material forming the belt. Accordingly, the antenna is less likely to be damaged even when being subjected to stress due to compression and expansion of the belt.

In the belt, the RFID preferably further includes a base, the IC chip is preferably provided in the base, the RFID is preferably provided in the back surface layer or the inner surface layer of the laminate, and a material of the base is preferably the same as a material of a layer of the laminate in which the RFID is provided.

According to the above configuration, since the material of the base is the same as the material of the layer of the laminate in which the RFID is provided, the belt can be integrated with the base. Accordingly, the RFID can be more firmly fixed to the belt.

In the belt, the RFID is preferably a sensor-integrated RFID provided with the sensor.

According to the above configuration, since the sensor-integrated RFID may be disposed in the belt, the manufacturing process can be simplified as compared with a case where the sensor and the RFID are disposed in the belt respectively.

In addition, since the sensor and the RFID are integrated with each other, it is possible to ensure the ease and reliability of the connection between the sensor and the RFID.

In the belt, the belt preferably includes a plurality of sensors and a plurality of RFIDs, and each of the sensors is preferably connected to at least one of the RFIDs.

According to the above configuration, since the belt includes the plurality of sensors, a plurality of pieces of information can be obtained in a plurality of locations in the belt.

In addition, according to the above configuration, it is possible to ensure sufficient time for each RFID to process the state information on the belt detected by the sensor, as compared with a case where only one RFID is provided for the plurality of sensors. Further, it is possible to easily specify each sensor and easily correct data detected by each sensor.

According to another aspect of the present invention, there is provided a system for acquiring belt state information including: a belt including a laminate having a back surface layer disposed on a back surface side and a cord layer having a tension member, a sensor provided in the laminate and configured to detect a state of the belt, and a passive RFID also provided in the laminate and configured to transmit state information on the belt detected by the sensor to an outside; and a reader configured to receive a signal from the RFID. The RFID operates by an electromagnetic wave transmitted from the reader and transmits the state information on the belt to the reader.

According to the above configuration, the state information on the belt detected by the sensor can be received by disposing the reader at or bringing the reader close to a location separated by a certain distance from the belt including the RFID. Accordingly, the state information on the belt can be acquired from a location separated by a certain distance from the belt running between pulleys.

In addition, according to the above configuration, since the RFID using the electromagnetic wave from the reader as a driving source is employed, it is possible to provide the system for acquiring belt state information that requires no battery replacement.

In the system for acquiring belt state information, the tension member is preferably a cord, the laminate preferably includes the back surface layer, an inner surface layer disposed on an inner surface side, and a cord layer including the cord embedded between the back surface layer and the inner surface layer, and the belt is preferably a power transmission belt.

According to the above configuration, it is possible to provide the system for acquiring belt state information that can transmit the belt state information detected by the sensor to the outside without mounting a battery on the power transmission belt running at a high speed between pulleys.

Advantageous Effects of Invention

It is possible to construct a system that requires no battery in a belt equipped with a sensor that detects a belt state and an RFID that transmits a detection result to the outside.

DESCRIPTION OF EMBODIMENTS

Embodiments

Hereinafter, a power transmission belt and a system for acquiring state information on the power transmission belt according to an aspect of the present invention is described with reference to the drawings. In the present embodiment, pressure sensors 16 are used as a sensor.

In the power transmission belt of the present embodiment, a V-belt 1 including the pressure sensors 16 is described as an example.

Figure 1:
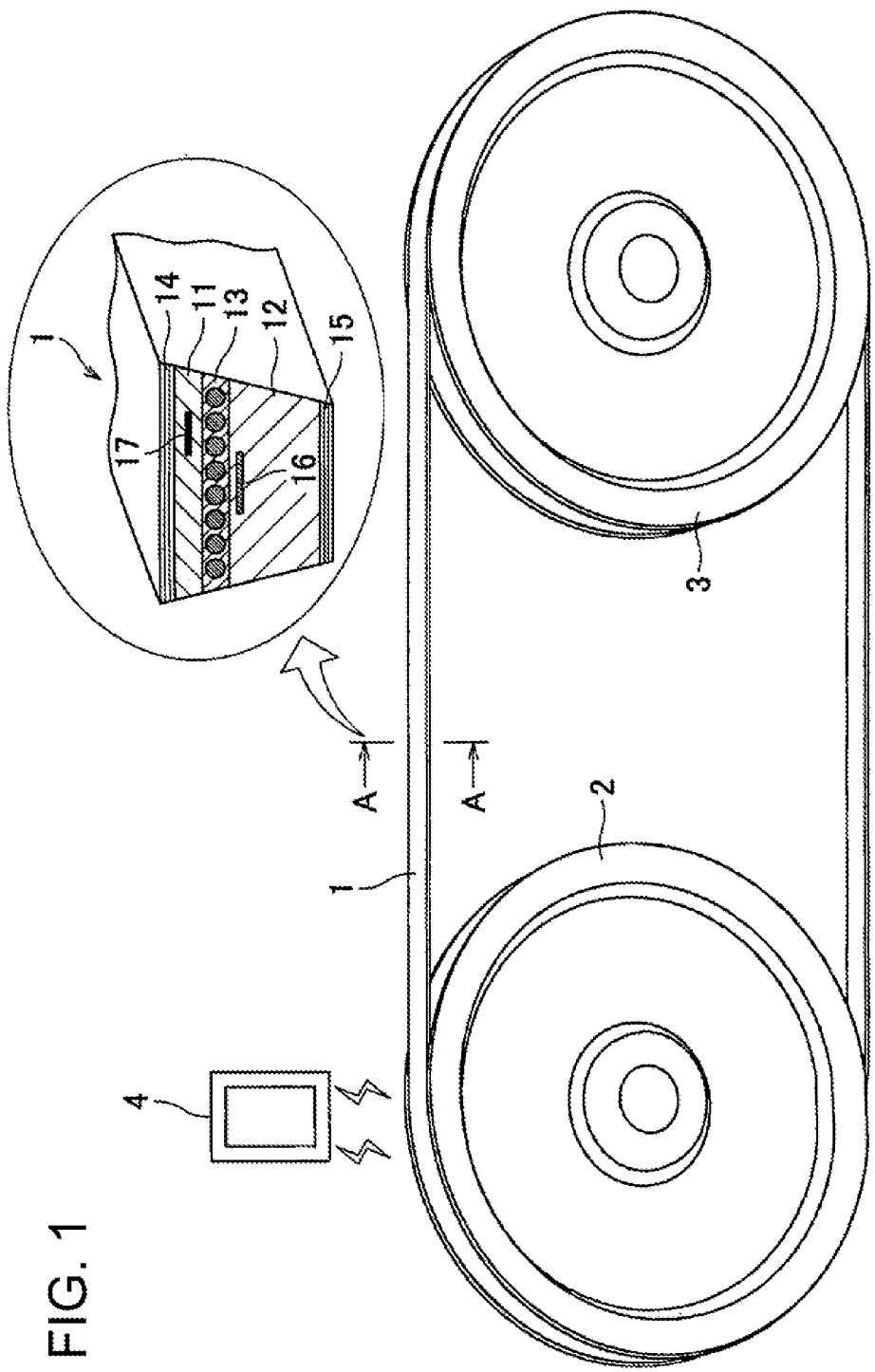
FIG. 1 shows a V-belt and a system for acquiring V-belt pressure data according to an embodiment.

The V-belt 1 is wound, for example, between a driving pulley 2 and a driven pulley 3 in a power transmission mechanism (system) such as an engine auxiliary machine drive system (see FIG. 1).

The power transmission mechanism may also use a tensioner or an idler pulley.

(Configuration of V-Belt 1)

Figure 2:
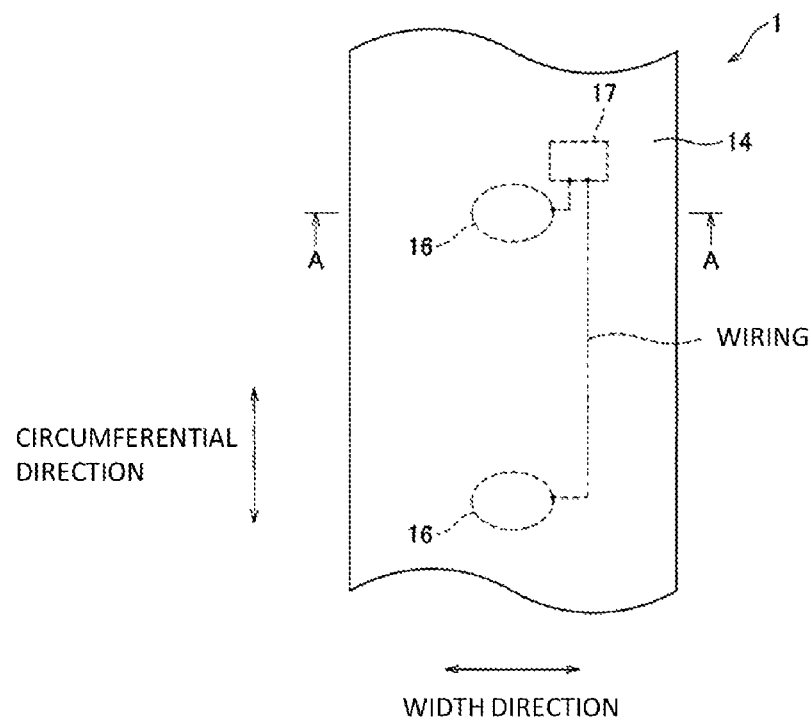
FIG. 2 is an enlarged top view of a part of the V-belt.
Figure 3:
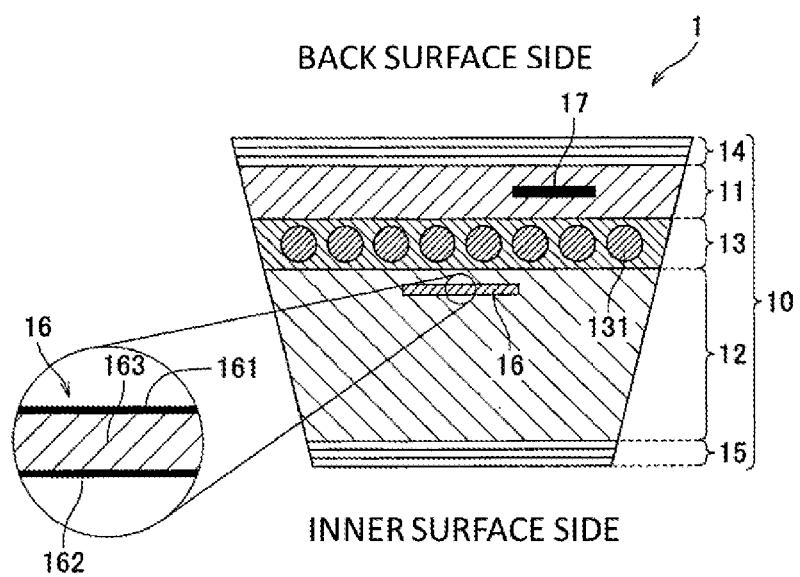
FIG. 3 is a cross-sectional view of a V-belt 1 taken along a line A-A.

As shown in FIG. 2 and FIG. 3, the V-belt 1 includes a tension layer 11 (corresponding to a back surface layer) disposed on a back surface side of the V-belt 1, a compression layer 12 (corresponding to an inner surface layer) disposed on an inner surface side of the V-belt 1, a cord layer 13 provided between the tension layer 11 and the compression layer 12 and including a cord 131 spirally embedded along the circumferential direction of the V-belt 1, a top fabric 14 (corresponding to an outer fabric layer) disposed on a back surface of the V-belt 1, a bottom fabric 15 (corresponding to an outer fabric layer) disposed on an inner surface of the V-belt 1, two pressure sensors 16 disposed at the center on the width direction of the V-belt 1 in a back surface side of the compression layer 12 at a predetermined interval in the circumferential direction, and a passive RFID tag 17 disposed in one end side of the tension layer 11 in the width direction of the V-belt 1. In the V-belt 1 of the present embodiment, the top fabric 14, the tension layer 11, the cord layer 13, the compression layer 12, and the bottom fabric 15 constitute a laminate 10.

Figure 4:
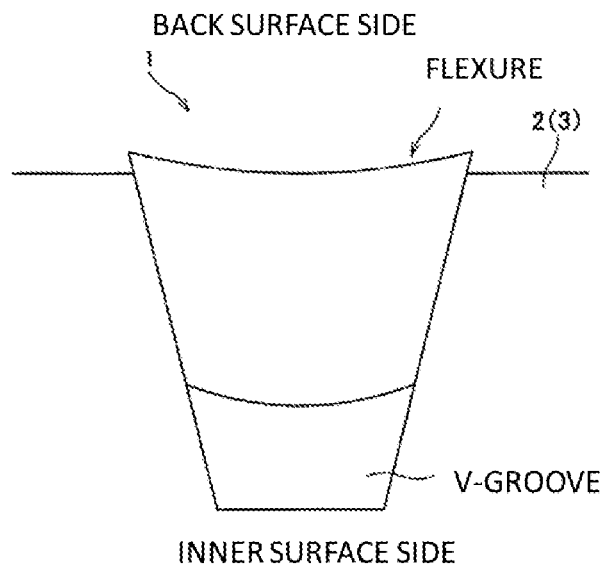
FIG. 4 shows a state in which the V-belt 1 is fitted into a V-groove provided in a driving pulley 2 and a driven pulley 3.

As shown in FIG. 3, the cross section of the V-belt 1 in the width direction is a V-shaped cross section, and both left and right side surfaces of the V-shaped cross section are frictional power transmission surfaces that come into contact with inner wall surfaces of a V-shaped groove provided in the driving pulley 2 and the driven pulley 3 (see FIG. 4).

(Tension Layer 11)

Examples of a rubber component of rubber composition forming the tension layer 11 include vulcanizable or cross-linkable rubbers such as diene rubbers (natural rubber, isoprene rubber, butadiene rubber, chloroprene rubber, styrene-butadiene rubber (SBR), acrylonitrile-butadiene rubber (nitrile rubber), hydrogenated nitrile rubber, and the like), ethylene-α-olefin elastomers, chlorosulfonated polyethylene rubber, alkylated chlorosulfonated polyethylene rubber, epichlorohydrin rubber, acrylic rubber, silicone rubber, urethane rubber, and fluororubber. These rubber components may be used alone or in combination of two or more. Preferable examples of the rubber component include ethylene-α-olefin elastomers (ethylene-α-olefin rubbers such as ethylene-propylene copolymer (EPM) and ethylene-propylene-diene terpolymer (EPDM)) and chloroprene rubber. A particularly preferable example of the rubber component is an ethylene-α-olefin elastomer having excellent durability relative to chloroprene rubber and containing no halogen. Examples of the diene monomer of the EPDM include dicyclopentadiene, methylene norbornene, ethylidene norbornene, 1,4-hexadiene, cyclooctadiene, and the like.

The rubber composition forming the tension layer 11 may further be blended with, as necessary, reinforcing materials such as carbon black, silica, and short fibers, fillers such as calcium carbonate and talc, crosslinking agents such as sulfur and organic peroxides, co-crosslinking agents such as N,N'-m-phenylenedimaleimide, and quinone dioxime, vulcanization accelerators, plasticizers, stabilizers, processing aids, colorants, and the like, which are usually blended in rubber. The short fibers may use cotton, polyester (PET, PEN, or the like), nylon (6 nylon, 66 nylon, 46 nylon, or the like), aramid (p-aramid, m-aramid), vinylon, and polyparaphenylene benzobisoxazole (PBO) fiber. These short fibers may be used alone or in combination of two or more.

(Compression Layer 12)

The compression layer 12 may be formed of the same material as the rubber composition forming the tension layer 11.

(Cord Layer 13)

In the cord layer 13, the cord 131 is spirally embedded in the rubber composition along the circumferential direction of the V-belt 1. The rubber composition forming the cord layer 13 is preferably a blending composition having more emphasis on the adhesiveness and the stress resistance than the rubber composition of the tension layer 11 and the compression layer 12 from the viewpoint of the adhesiveness to the cord 131 and the stress relaxation applied to the cord 131. Thus, the spirally embedded cord 131 is arranged at predetermined intervals in the width direction in a cross-sectional view of the V-belt 1 in the width direction.

Fibers forming the cord 131 employ synthetic fibers such as aramid fibers and polyester fibers (polyalkylene arylate fibers, polyethylene terephthalate fibers, polyethylene naphthalate fibers, and the like) having C2-4-alkylene arylate such as ethylene terephthalate and ethylene-2,6-naphthalate as a main constituent unit, and inorganic fibers such as carbon fibers from the viewpoint of high modulus. Polyester fibers and aramid fibers are preferable. These fibers may be multifilament yarns. The fineness of the multifilament yarns may be 2000 to 10000 denier, and preferably 4000 to 8000 denier.

As the cord 131, a twisted cord (plied twist, single twist, Lang twist, or the like) using the multifilament yarns is usually used, and the average wire diameter (fiber diameter of the twisted cord) of the cord 131 may be 0.5 to 3 mm, preferably 0.6 to 2 mm, and more preferably 0.7 to 1.5 mm.

In the present embodiment, one continuous cord 131 is wound and embedded in the circumferential direction of the V-belt 1 in a spiral manner, but a plurality of bundled cords 131 may be wound and embedded in the circumferential direction of the V-belt 1 in a spiral manner.

(Top Fabric 14 and Bottom Fabric 15)

The top fabric 14 and the bottom fabric 15 are made of cotton, polyester fiber, nylon, or the like, are woven into plain weave, twill weave, satin weave, or the like, and are woven fabrics in which the intersection angle between the warp and the weft is widened to about 900 to 120°.

The pressure sensors 16 and the passive RFID tag 17 disposed in the laminate 10 of the V-belt 1 are most likely to be damaged when the V-belt 1 bends to wind around the driving pulley 2 and the driven pulley 3. The degree of bending of the V-belt 1 varies depending on the type of the belt, the size of the diameter of the pulley around which the belt is wound, the magnitude of the tension applied to the belt, and the like. Therefore, in the present embodiment, the diameters of the driving pulley 2 and the driven pulley 3 and the tension of the V-belt 1 are set to such values that the pressure sensors 16 and the passive RFID tag 17 would not be damaged when the V-belt 1 is wound around the driving pulley 2 and the driven pulley 3. Specifically, the diameters of the driving pulley 2 and the driven pulley 3 are 40 mm or more, preferably 80 mm or more, and more preferably 100 mm or more. The tension of the V-belt 1 is preferably 60 kgf or less.

(Pressure Sensors 16)

The pressure sensors 16 use, for example, a piezoelectric element that generates an electric charge when receiving pressure. As shown in FIG. 3, each of the pressure sensors 16 includes electrode layers 161, 162 on two surfaces of a film-shaped piezoelectric layer 163 containing organic polymers. In the present embodiment, the thickness of the piezoelectric layer 163 is about 1 to 10 μm, and preferably 2 to 5 μm. In the present embodiment, the thickness of the electrode layers 161, 162 is about 0.1 to 1 μm, and preferably 0.1 to 0.3 μm. That is, the pressure sensor 16 has a thin structure. The pressure sensor 16 is electrically connected to the passive RFID tag 17 from the electrode layers 161, 162. In the present embodiment, as shown in FIG. 2, two pressure sensors 16 are arranged at a predetermined interval in the circumferential direction.

Examples of the material of the piezoelectric layer 163 include polyvinylidene fluoride, a copolymer of vinylidene fluoride and trifluoride ethylene, polylactic acid, a vinylidene cyanide-based polymer, odd nylon such as nylon 9 and nylon 11, aramid, and polyurea.

Examples of the electrode layers 161, 162 include vapor-deposited films, metal nets and wires, and conductive rubbers. Examples of the electrode layers 161, 162 further include a conductive fiber obtained by coating a fiber with a metal, a composite conductive fiber formed of an insulating fiber and a conductive fiber such as a metal wire or a metal foil, and a woven fabric including at least one of these fibers. Examples of the vapor-deposited films include, in addition to Ni—Al alloy, aluminum (Al), iron (Fe), copper (Cu), gold (Au), silver (Ag), and alloys thereof. Examples of the metal nets and wires include iron (Fe), copper (Cu), a copper alloy, and an aluminum alloy. Examples of the conductive rubber include those obtained by forming rubber composition used for the compression layer and the tension layer into a sheet shape having a thickness of 10 μm to 5 mm.

The electrode layers 161, 162 are preferably subjected to a surface treatment for joining (integrating) the electrode layers 161, 162 to the surrounding rubber layer (part containing the rubber composition in the laminate 10) by chemical or physical bonding. Examples of the surface treatment include coating (lamination) of a resin film and silane coupling treatment.

As described above, since the pressure sensor 16 has a film shape, the pressure sensor 16 can be integrated with the laminate 10 even in the V-belt 1 having a relatively small thickness. In addition, it is only necessary to add a step of arranging the film-shaped pressure sensor 16 to the V-belt 1 constituted by the laminate 10 in the manufacturing process, which contributes to efficient manufacturing of the V-belt 1 while using the existing manufacturing process. Further, since the pressure sensor 16 is formed in a film shape, the pressure sensor 16 is suitable for detecting the pressure in the thickness direction of the pressure sensor 16.

The pressure sensor 16 has a small thickness as described above, and is laminated at the center in the width direction in the back surface side of the compression layer 12 and integrated as a part of the V-belt 1.

Here, to differentiate from a method of externally attaching a commercially available sensor to the belt or simply embedding the sensor in the belt, "the sensor is integrated with the belt" means in a broad sense that (A) the sensor is integrated with the belt in appearance and (B) the belt including the sensor has strength, elasticity, durability, and the like to ensure functions as the power transmission belt. In a narrow sense, in addition to (A) and (B), "the sensor is integrated with the belt" means that (C) an interface (boundary) between a constituent part (for example, piezoelectric layer+electrodes (on both sides)) of the sensor and the laminate (for example, part including the rubber composition in the laminate) is joint by chemical bonding or physical bonding from the viewpoint of a joining state of the interface. For example, when the sensor is a pressure sensor and the electrode layers are made of a metal, it is preferable to perform the surface treatment described above (preferable to satisfy the condition (C) described above) since the sensor would not be joint to the surrounding rubber layer (part including the rubber composition in the laminate) as it is.

In the present embodiment, the pressure sensor 16 are the film-shaped piezoelectric layer 163 containing organic polymers, but the pressure sensor 16 may also be obtained by forming the piezoelectric layer 163 by dispersing piezoelectric powder in the rubber composition forming the tension layer 11 or the compression layer 12, and disposing the electrode layers 161, 162 on both surfaces of the piezoelectric layer 163.

Figure 7:
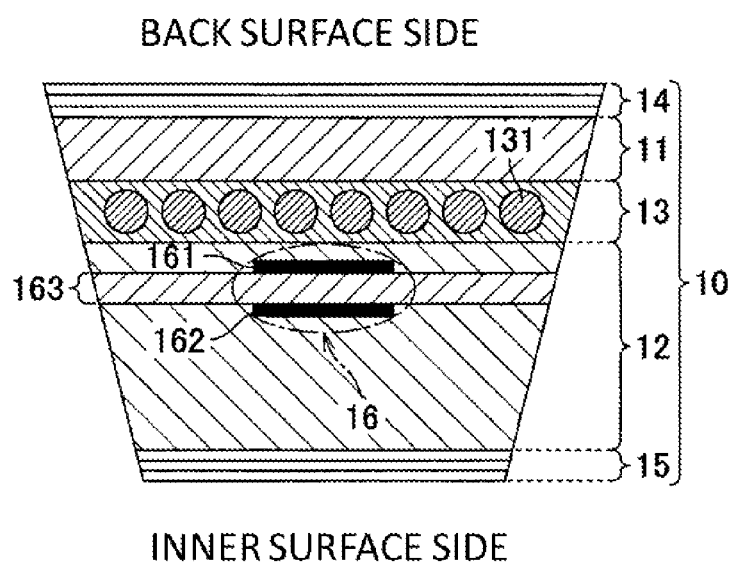
FIG. 7 is a cross-sectional view in the belt width direction of a V-belt including a pressure sensor having a piezoelectric layer obtained by dispersing piezoelectric powder in rubber composition forming a compression layer in a part of the compression layer.

For example, as shown in FIG. 7, the pressure sensor 16 may be formed by disposing the piezoelectric layer 163, which is obtained by dispersing the piezoelectric powder in the rubber composition forming the compression layer 12, in a part of the layer of the compression layer 12, and disposing the electrode layers 161, 162 to sandwich a part of the piezoelectric layer 163 on an upper surface and a lower surface of the piezoelectric layer 163.

Figure 8:
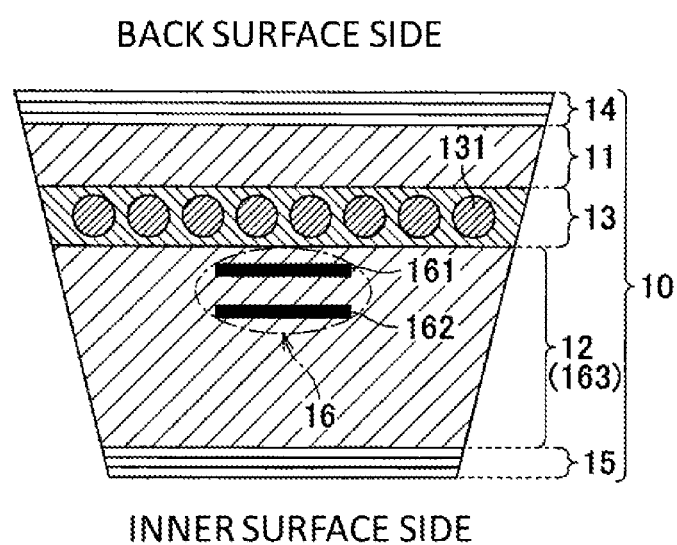
FIG. 8 is a cross-sectional view in the belt width direction of a V-belt including a pressure sensor having a piezoelectric layer formed of rubber composition in which piezoelectric powder is dispersed over the entire compression layer.

As shown in FIG. 8, the entire compression layer 12 may be the piezoelectric layer 163 formed of rubber composition dispersed with piezoelectric powder, and the two electrode layers 161, 162 serving as upper and lower electrodes may be embedded in desired positions of the piezoelectric layer 163. In this case, the two electrode layers 161, 162 and the part of the piezoelectric layer 163 sandwiched between the two electrode layers 161, 162 constitute the pressure sensor 16 and function as a pressure sensor.

In the above embodiment, the pressure sensor 16 can be integrated with the V-belt 1 by dispersing and incorporating the piezoelectric powder into the rubber composition forming the compression layer 12 at the manufacturing stage. It is only necessary to add a step of mixing the piezoelectric powder into the rubber composition forming the laminate 10 in the manufacturing process, which contributes to efficient manufacturing of the V-belt 1 while using the existing manufacturing process. Since the piezoelectric powder can function as a piezoelectric body simply by being dispersed in the rubber composition forming the laminate 10, a desired portion of the V-belt 1 can function as the pressure sensor 16.

In the above embodiment, when the electrode layers 161, 162 are the metal nets, the pressure sensor 16 and the surrounding rubber are crosslinked (chemically bonded) in a vulcanization step and the metal nets and the rubber layer are joint to each other by an anchor effect (physical bonding) so that the entire compression layer 12 is integrated. Accordingly, the pressure sensor 16 and the V-belt 1 can be easily integrated.

In addition, the piezoelectric layer 163 may be formed by holding the piezoelectric powder in the top fabric 14 or the bottom fabric 15, and the electrode layers 161, 162 are disposed on both surfaces of the piezoelectric layer 163. In this case, for example, a method for incorporating the piezoelectric powder in the warp and weft forming the top fabric 14 or the bottom fabric 15 in advance and a method for incorporating the piezoelectric powder in the bonding process may be used.

Examples of the piezoelectric powder include barium titanate, crystal, lead zirconate titanate, lithium niobate, lithium tantalate, potassium sodium tartrate, and zinc oxide. The shape of the piezoelectric powder may be a flake shape or a needle shape.

In the present embodiment, the pressure sensor 16 generates an electromotive force due to deformation of the sensor, but the electric power may be supplied from the passive RFID tag 17 electrically connected thereto. In addition, a battery may be used as a driving power source, and a wireless power feeding system in which wireless power is transmitted from the outside, or environmental power generation (kinetic system in which electric power is generated by running of the V-belt 1, or the like) may be adopted.

(Passive RFID Tag 17)

In the present embodiment, as shown in FIG. 2 and FIG. 3, the passive RFID tag 17 is a thin circuit electrically connected to the pressure sensor 16, and is embedded in one end side of the tension layer 11 in the width direction of the V-belt 1.

Figure 9:
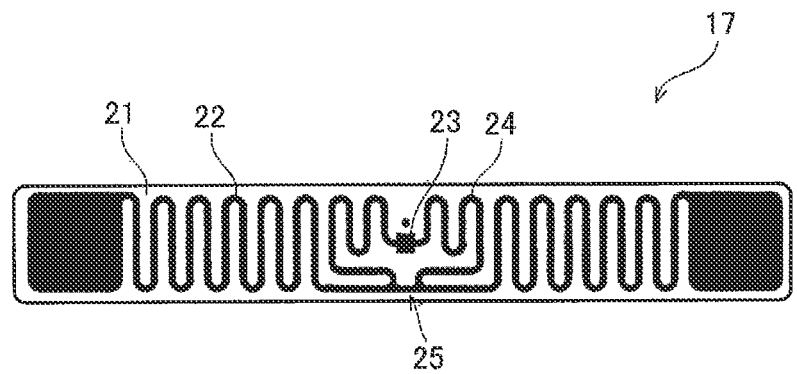
FIG. 9 shows a passive RFID tag 17.

As shown in FIG. 9, the passive RFID tag 17 includes a base 21, an antenna 22, and an IC chip 23.

Examples of the material of the base 21 include polyethylene terephthalate and polyethylene, and nylon is preferable from the viewpoint of the adhesion with the rubber forming the belt. The most preferable material is the same as the rubber composition forming the V-belt 1. That is, in this case, the base 21 and the V-belt 1 are integrated when the belt is completed.

The antenna 22 is a part that wirelessly communicates with an external reader 4 (described later), and is formed by etching a metal into the shape of the antenna to the base 21. The material, shape, and size of the antenna 22 are not particularly limited.

The antenna 22 is preferably made of copper or a copper alloy that adheres to rubber when, for example, the V-belt 1 is made of vulcanizable rubber. When the antenna 22 is made of a metal that does not react or adhere to rubber, it is preferable to perform a surface treatment with a silane coupling agent (for example, 3-aminopropyltriethoxysilane or bis(triethoxysilylpropyl)tetrasulfide) or a plasma treatment. Accordingly, the antenna 22 can be embedded without lowering the durability of the V-belt 1.

Here, when a general RFID tag is embedded in the V-belt 1, the antenna of the RFID tag may be damaged during belt running. For example, US Patent Application Publication No. 2012/0323371 discloses that an RFID tag is disposed in a cord layer of a belt, which cannot avoid application of stress to an antenna due to extension or compression of the belt. Although it is also disclosed that the RFID tag is protected by a sheath made of glass, plastic, or the like, it is necessary to match physical properties of the sheath with physical properties of the belt body to smoothly run the belt, which makes the belt manufacturing process complicated. For this reason, in the present embodiment, the material and shape of the antenna 22 are preferably such that the antenna 22 would not be damaged when the passive RFID tag 17 is embedded in the V-belt 1.

When the adhesion between the antenna 22 and the rubber forming the V-belt 1 is strong, the antenna 22 may be damaged due to stress caused by compression and extension of the rubber. To avoid this, it is preferable to appropriately weaken the adhesion between the antenna 22 and the rubber of the V-belt 1. For example, it is preferable to carry fine particles having low surface energy, such as TEFLON (registered trademark) powder, on a surface of the antenna 22. Accordingly, the interaction between the antenna 22 and the rubber forming the V-belt 1 can be weakened and the stress applied to the antenna due to compression and extension of the rubber can be reduced.

In addition, the antenna 22 preferably uses a conductive linear material. When the base 21 is used, the V-belt 1 may swell in a part where the passive RFID tag 17 is embedded in the V-belt 1. In this case, the passive RFID tag 17 is peeled off from the swelling and the V-belt 1 is damaged. By using a linear material for the antenna 22, the V-belt 1 can be made less likely to swell in the part where the passive RFID tag 17 is embedded. Specifically, the antenna 22 is preferably made of a conductive linear material such as a metal thin film, a metal wire, a conductive fiber obtained by coating a fiber with a metal, a composite conductive fiber made of an insulating fiber and a conductive fiber such as a metal wire or a metal foil, or a woven fabric containing at least one of these fibers.

As shown in FIG. 9, the antenna 22 preferably has a meander line shape in which a conductive wire is bent into a crank shape. Accordingly, the stress applied to the antenna due to compression and extension of the rubber can be dispersed. As shown in FIG. 9, the antenna 22 and the IC chip 23 are preferably connected via a connection conductive wire 24, and the direction in which the antenna 22 and the IC chip 23 are arranged is preferably orthogonal to the extension direction of the antenna 22. The antenna 22 is preferably a dipole antenna made of one conductive linear material and extending from a connection portion 25 connected to the connection conductive wire 24 of the antenna 22 to one side and the other side in the extension direction of the antenna (left-right direction in FIG. 9). Normally, the strength of a part where the antenna 22 and the IC chip 23 are connected is weak. With the above configuration, electric power is supplied from the antenna 22 to the IC chip 23 through the connection conductive wire 24 in a direction perpendicular to the extension direction of the antenna 22. Accordingly, stress is less likely to be transmitted to the connection portion 25 where the IC chip 23 and the antenna 22 are connected. Since the antenna 22 is a dipole antenna made of one conductive linear material, stress applied to the antenna 22 is dispersed and the connection portion 25 connecting the antenna 22 and the IC chip 23 is less likely to be damaged.

When the antenna 22 is made of a conductive linear material, the base 21 does not need to be used. In addition, the impedance of the antenna may change due to the dielectric constant of the rubber around the antenna and the communication efficiency may decrease. For this reason, the shape of the antenna 22 is preferably selected in consideration of compatibility with the rubber forming the V-belt 1.

The IC chip 23 is connected to a terminal of the antenna 22 by a conductive adhesive material and is electrically connected to the pressure sensor 16. Pressure data (corresponding to state information on the V-belt 1) detected and observed by the pressure sensor 16 is written in a memory incorporated in the IC chip 23.

When an electromagnetic wave is transmitted from the reader 4 (described later), a current flows through the passive RFID tag 17 due to resonance with the electromagnetic wave (that is, no battery is necessary). Subsequently, the IC chip 23 sends the pressure data written in the memory to the antenna 22. Accordingly, the reflectance of a reflected wave of the antenna 22 in response to the electromagnetic wave transmitted from the reader 4 changes. Then, the reader 4 recognizes the reflected wave whose reflectance has changed, and reads the pressure data (state information on the V-belt 1).

The passive RFID 17 may be integrated with the pressure sensor 16. In this case, for example, the IC chip 23 may have a function of a sensor.

The passive RFID tag 17 is preferably disposed at the center of the tension layer 11 in the width direction of the V-belt 1. This contributes to straight running of the V-belt 1. The passive RFID tag 17 may be disposed at the center of the compression layer 12 in the width direction of the V-belt 1. The passive RFID tag 17 may also be disposed at an upper portion of the top fabric 14 (back surface of the V-belt 1). In this case, it is desirable to cover the passive RFID tag 17 with a protective canvas so that the appearance is not impaired.

As described above, the passive RFID tag 17 is also integrated with the V-belt 1 by being embedded in the tension layer 11 of the V-belt 1, and therefore the function of the V-belt 1 is implemented without impaired appearance. The tension layer 11 of the V-belt 1 is a location where the pressure is less likely to be directly applied than the compression layer 12, and therefore excessive load can be prevented from being applied to the passive RFID tag 17 that is an electronic device.

Figure 11:
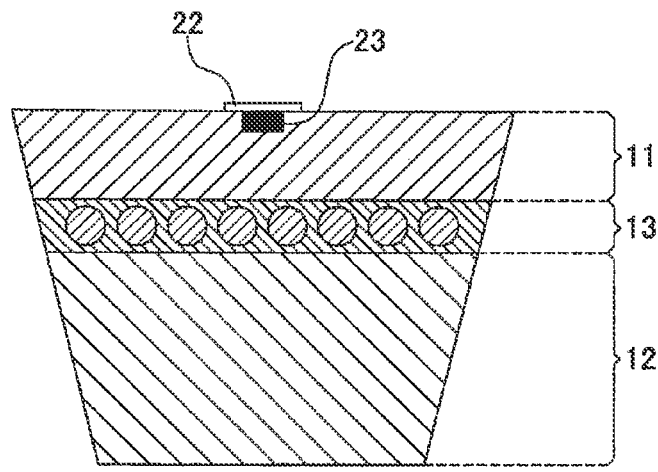
FIG. 11 is a cross-sectional view in the belt width direction of the V-belt 1 in which the passive RFID tag 17 is disposed in a back surface-side surface.

In the present embodiment, the passive RFID tag 17 is embedded in the V-belt 1. Alternatively, the passive RFID tag 17 may be arranged on the back side surface of the V-belt 1 to improve the signal intensity. However, since the IC chip 23 is thicker than the antenna 22, the IC chip 23 slightly protrudes from the surface of the V-belt 1 when the IC chip 23 is disposed on the back side surface of the V-belt 1. For this reason, when a tensioner or the like that comes into contact with the back surface of the belt is used in a power transmission system, the IC chip 23 protruding from the surface on the back surface side of the V-belt 1 may come into contact with the tensioner or the like and be damaged. Therefore, even when the passive RFID tag 17 is disposed on the back side surface of the V-belt 1, as shown in FIG. 11, the IC chip 23 is preferably embedded in the V-belt 1 and only the antenna 22 is disposed on the back side surface of the V-belt 1.

Figure 12:
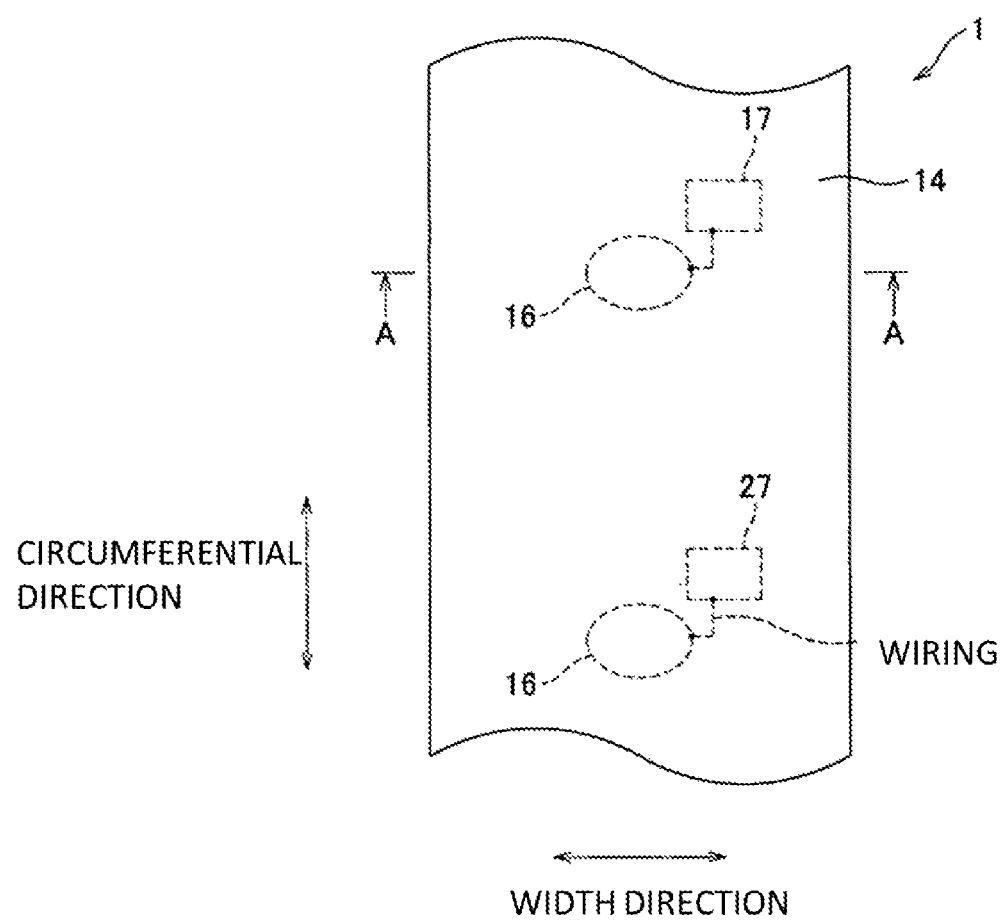
FIG. 12 is an enlarged top view of a part of a V-belt according to another embodiment.

As shown in FIG. 12, when two pressure sensors 16 are provided, one pressure sensor 16 may be connected to the passive RFID tag 17, and the other be connected to a passive RFID tag 27. With this configuration, it is easy to specify the sensors and it is possible to omit data correction detected by the sensors.

In the above configuration, a plurality of pressure sensors may be connected to the passive RFID tag 17, or one pressure sensor may be connected to the passive RFID tags 17, 27.

That is, a plurality of sensors may be connected to one passive RFID tag 17, or one sensor may be connected to a plurality of passive RFID tags 17.

According to the V-belt 1, since the pressure sensor 16 that detects the pressure applied to the V-belt 1 is integrated as a part of the laminate 10, the pressure applied to the V-belt 1 can be detected and observed. Based on detected and observed pressure values, the degree of deterioration and damage of the V-belt 1 and abnormalities of the driving pulley 2, the driven pulley 3, and the like around which the V-belt 1 is wound can be known.

Accordingly, the replacement time can be determined by accurately knowing the state of the V-belt 1. Since the pressure sensor 16 is integrated with the V-belt 1, strength, elasticity, durability, and the like that ensure the function of a power transmission belt that transmits power can be provided without impairing the appearance.

(System for Acquiring Pressure Data of V-Belt 1)

In the present embodiment, as shown in FIG. 1, it is possible to implement a system 100 for acquiring pressure data (state information) of the V-belt 1 (corresponding to a system for acquiring state information on the power transmission belt) that can detect and observe the pressure applied to the V-belt 1 wound between the driving pulley 2 and the driven pulley 3 by using the V-belt 1 and the receiver 4.

(Reader 4)

Figure 10:
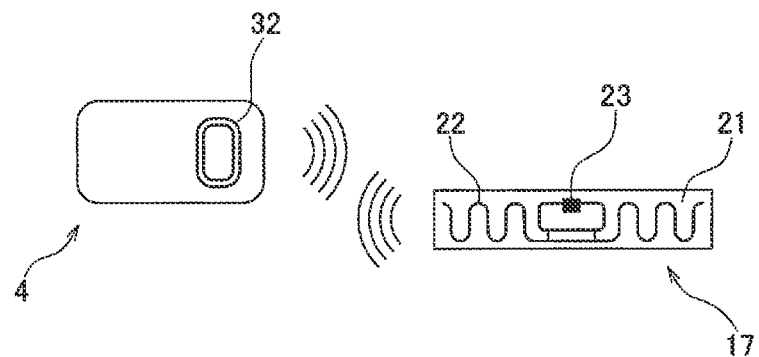
FIG. 10 shows a mode of wireless communication between a reader 4 and the passive RFID tag 17.

An example of the reader 4 includes a portable tablet and the like. As shown in FIG. 10, the reader 4 includes an antenna 32 that transmits a radio signal to the passive RFID tag 17 of the V-belt 1 and receives the pressure data (state information on the V-belt 1) transmitted from the passive RFID tag 17. The reader 4 can store, analyze, and display analysis results by program control after receiving the pressure data. Communication between the reader 4 and the passive RFID tag 17 uses a frequency in the 900 MHz band, and a frequency in the LF band, the HF band, or the 2.4 GHz band may be used.

The reader 4 may include only a portion having a transmission and reception function, and may be disposed on the driving pulley 2, the driven pulley 3, or an object (a circumstantial device, a cover, or the like) disposed around the V-belt 1. In this case, after the reader 4 is connected to a personal computer or the like and has received the pressure data transmitted from the passive RFID tag 17, the reader 4 stores, analyzes, and displays the analysis results by program control of the personal computer.

For example, in the analysis by the program control, in addition to outputting a pressure value of the V-belt 1, the degree of deterioration of the V-belt 1 is analyzed by comparing pressure data (value) detected and observed by the pressure sensor 16 and transmitted from the passive RFID tag 17 with reference pressure data (value) obtained by analyzing data measured in advance, the presence or absence of replacement of the V-belt 1, the replacement time, and other abnormalities are displayed on a display screen of the reader 4 or the personal computer.

In the analysis by the program control, the running speed of the V-belt 1 wound between the driving pulley 2 and the driven pulley 3 can be calculated by detecting the pressure applied at the timing when the running V-belt 1 comes into contact with the driving pulley 2 with the two pressure sensors 16 arranged at a predetermined interval, and dividing the predetermined interval (distance) by the time difference (time) between timings at which the two pressure sensors 16 detect the pressure. Further, the slip ratio of the V-belt 1 can also be calculated from the difference between the calculated running speed of the V-belt 1 and the rotation speed of the driving pulley 2 measured separately.

In the analysis by the program control, it is also possible to estimate the current internal temperature of the V-belt 1 from the pressure data (value) detected and observed by the pressure sensor 16, by referring to reference data of the internal temperature of the V-belt 1 that corresponds to the pressure data (value) and is obtained by analyzing the data measured in advance.

By using the system 100 for acquiring pressure data of the V-belt 1, the reader 4 can receive the pressure data of the V-belt 1 detected by the pressure sensor 16 by disposing the reader 4 at or bringing the reader 4 close to a location separated by a certain distance from the V-belt 1 including the passive RFID tag 17. Accordingly, the pressure data of the V-belt 1 can be acquired from a location separated by a certain distance from the V-belt 1 that runs at a high speed between the driving pulley 2 and the driven pulley 3.

Other Embodiments

Figure 5:
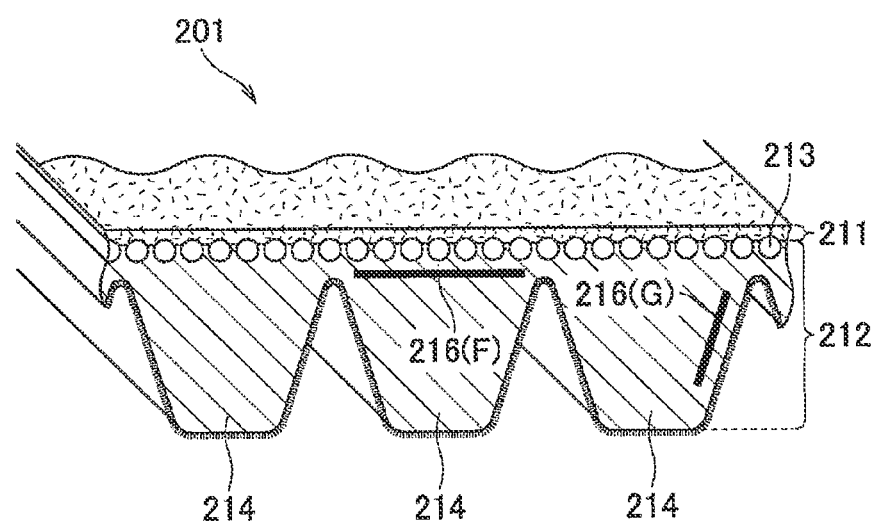
FIG. 5 shows a V-ribbed belt according to another embodiment.

Although the V-belt 1 has been described in the above embodiment, a sensor 216 may also be employed in a V-ribbed belt 201 shown in FIG. 5. The V-ribbed belt 201 is made of rubber composition and includes a tension layer 211 (back surface layer), a compression layer 212 (inner surface layer) having three ribs 214 extending parallel to each other along the circumferential direction of the V-ribbed belt 201, and a cord 213 (cord layer) embedded between the tension layer 211 and the compression layer 212 along the circumferential direction of the V-ribbed belt 201. As shown in FIG. 5, for example, the sensor 216 is disposed at the center (position F) in the width direction in a back surface side of the compression layer 212. The sensor 216 may also be disposed in one side surface side of the ribs 214, that is, in a frictional power transmission surface side (position G) where the V-ribbed belt 201 comes into contact with an inner wall surface of a groove provided in the driving pulley 2 and the driven pulley 3.

Figure 6:
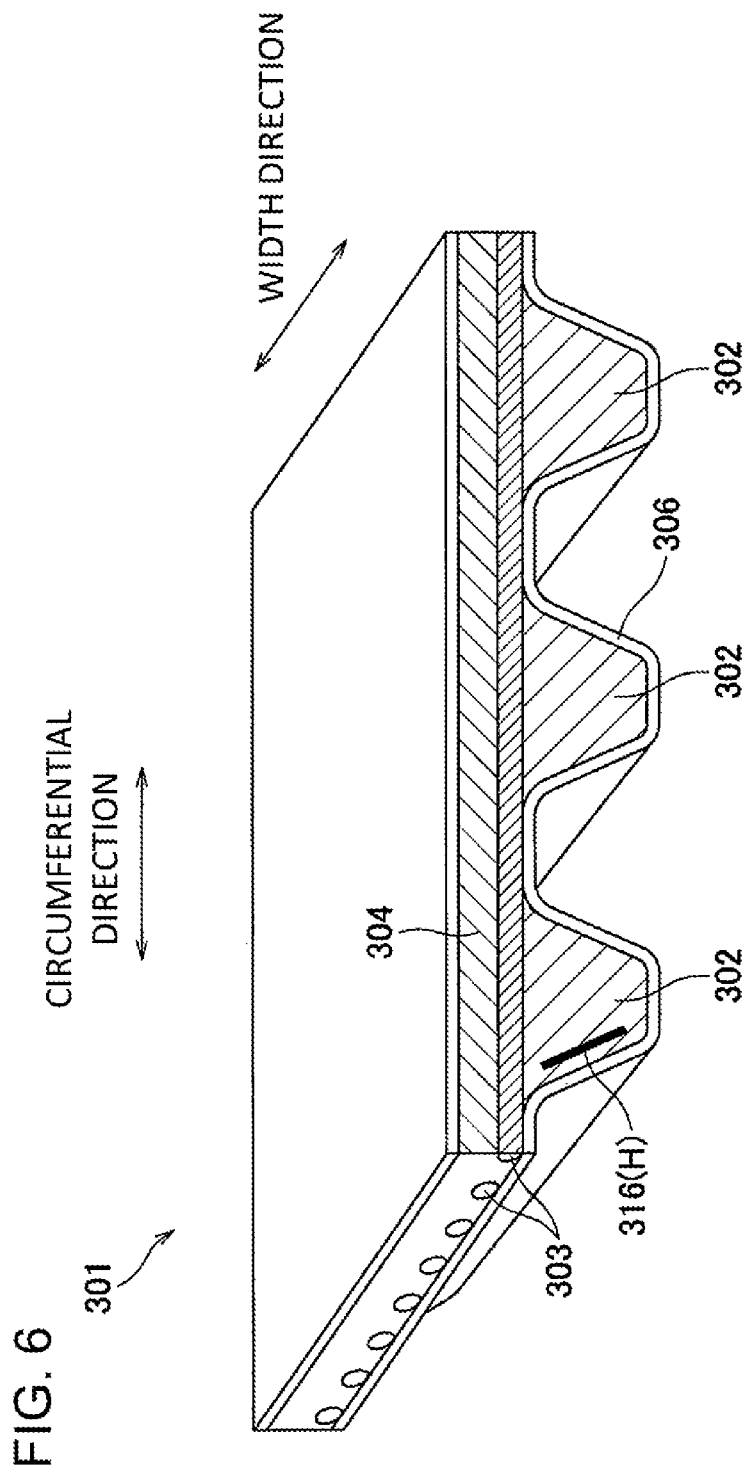
FIG. 6 shows a toothed belt according to another embodiment.

A sensor 316 may be employed in a toothed belt 301 shown in FIG. 6. The toothed belt 301 includes a plurality of tooth portions 302 (inner surface layers) provided at predetermined intervals in the circumferential direction of the toothed belt 301, a back portion 304 (back surface layer) in which a cord 303 (cord layer) is embedded, and a tooth fabric 306 covering surfaces of the plurality of tooth portions 302. For example, as shown in FIG. 6, the sensor 316 is disposed at a front portion (position H) of the tooth portions 302, that is, in a surface side where the toothed belt 301 comes into contact with tooth portions provided on the driving pulley 2 and the driven pulley 3.

In the above embodiment, the pressure sensor 16 is disposed in the tension layer 11 or the compression layer 12. Alternatively, the pressure sensor 16 may be disposed between the top fabric 14 and the tension layer 11, between the tension layer 11 and the cord layer 13, between the cord layer 13 and the compression layer 12, or between the compression layer 12 and the bottom fabric 15.

When the V-belt 1 has a small thickness (9 mm) (including power transmission belts such as the V-ribbed belt 201 and the toothed belt 301), the entire V-belt 1 may function as a pressure sensor by disposing the electrode layer 161 in the back surface side of the tension layer 11, disposing the electrode layer 162 in the inner surface side of the compression layer 12, and forming the piezoelectric layer 163 by dispersing the piezoelectric powder in the rubber composition forming the tension layer 11, the cord layer 13, and the compression layer 12 laminated between the electrode layer 161 and the electrode layer 162.

Although the sensor described in the above embodiment is a pressure sensor, the sensor integrated with the V-belt 1 may be a temperature sensor or a strain sensor. When the V-belt 1 is continuously used under various external pressure and internal pressure applied to the V-belt 1, an increase in the internal temperature due to the pressure, an increase in the internal temperature of the V-belt 1 due to an influence of frictional heat or the like, or distortion may occur in the V-belt 1. Therefore, when a temperature sensor or a strain sensor is integrated with the V-belt 1, deterioration or damage of the V-belt 1 can be known by detecting and observing the internal temperature or the magnitude of distortion of the V-belt 1 (state of the V-belt 1).

For example, the strain sensor includes a Wheatstone bridge circuit including a resistor (electric conductor) whose resistance value changes by deformation, and the resistor is embedded in the belt and connected to a passive RFID tag also embedded in the belt.

The sensor may be disposed at various locations of the laminate in accordance with state information on the belt to be detected.

The passive RFID tag 17 is preferably disposed in the same layer as the layer in which the sensor is disposed in consideration of the ease and reliability of connection with the sensor. On the other hand, as described above, in view of improving the signal intensity of the tag, the tag is preferably disposed in the back surface side of the laminate.

Therefore, for example, when the sensor is disposed in the inner surface layer, the passive RFID tag 17 is preferably disposed in the inner surface layer from the viewpoint of ease of wiring connection, and is preferably disposed in the back surface layer from the viewpoint of signal intensity.

However, when the tag and the sensor are not bonded by wires (electromagnetic coupling or the like), or when a sensor including the tag is provided (for example, a change in capacitance between the sensor and the tag is sensed), the tag and the sensor do not need to be disposed in the same layer.

In the above embodiments, the sensor 16 and the passive RFID tag 17 are embedded in the power transmission belt. However, the sensor 16 and the passive RFID tag 17 may be embedded in a transport belt. Although no transport belt is shown, for example, the transport belt includes a surface cover layer (corresponding to a back surface layer), a first tension member canvas (corresponding to a tension member layer), an intermediate layer, and a second tension member canvas laminated in order from an outer circumstantial side to an inner circumstantial side of the transport belt. The sensor 16 and the passive RFID tag 17 are embedded in the cord layer, for example.

Example

Figure 13:
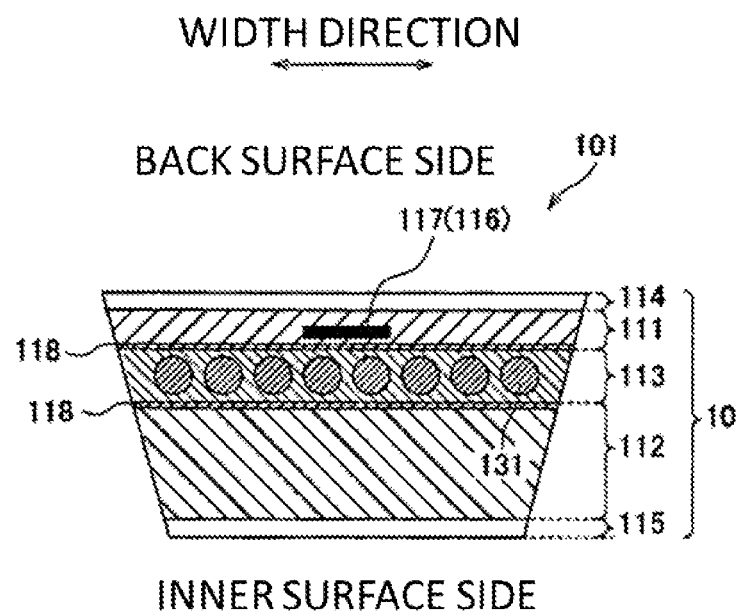
FIG. 13 is a cross-sectional view in the width direction of a V-belt according to an example.
Figure 14:
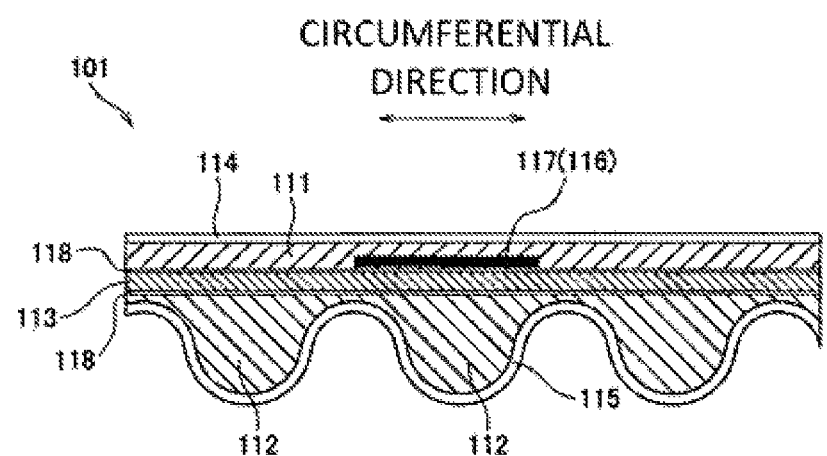
FIG. 14 is a cross-sectional view in the circumferential direction of the V-belt according to the example.

Next, a specific example of the present invention is described. In the example of the present invention, a raw edge cogged V-belt 101 (hereinafter, also simply referred to as a V-belt 101) was used as a power transmission belt. The length along the width direction on a back side of the raw edge cogged V-belt 101 is 22.3 mm, the belt thickness is 11.4 mm, and the length along the circumferential direction is 1550 mm. As shown in FIG. 13 and FIG. 14, the raw edge cogged V-belt 101 includes an tension layer 111 disposed on a back surface side of the V-belt 101, a compression layer 112 disposed on an inner surface side of the V-belt 101, a cord layer 113 provided between the tension layer 111 and the compression layer 112 and including the cord 131 spirally embedded along the circumferential direction of the V-belt 101, an top fabric 114 disposed on a back surface of the V-belt 101, and a bottom fabric 115 disposed on an inner surface of the V-belt 101. An adhesive rubber layer 118 is disposed between the tension layer 111 and the cord layer 113 and between the compression layer 112 and the cord layer 113. In the example, a passive RFID tag 117 is integrated with a sensor 116. The passive RFID tag 117 integrated with the sensor 116 is disposed at the center in the width direction of the tension layer 111 of the V-belt 101.

Table 1 shows composition of the tension rubber forming the tension layer 111, composition of the compression rubber forming the compression layer 112, and composition of the adhesive rubber forming the adhesive rubber layer 118 of the V-belt 101 according to the example.

TABLE 1

| Blending (mass) | Compression Rubber and Tension Rubber | Adhesive Rubber |
|---|---|---|
| CR | 100 | 100 |
| Stearic Acid | 2 | 2 |
| Aramid Short Fiber | 20 | — |
| Naphthenic Oil | 5 | 5 |
| Silica | — | 20 |
| Carbon Black HAF | 50 | 30 |
| Zinc Oxide | 5 | 5 |
| Magnesium Oxide | 4 | 4 |
| Anti-oxidant | 4 | 2 |
| Vulcanization Accelerator TT | 2 | 1 |
| Sulfur | 1 | 1 |
| Total | 193 | 170 |

CR (chloroprene rubber): "PM-40" manufactured by DENKA Co., Ltd.

Aramid short fiber: "TOWALON (registered trademark)" manufactured by Teijin Co., Ltd., modulus 88 cN, fineness 2.2 dtex, fiber length 3 mm Naphthenic oil: "DIANA (registered trademark) process oil NS-90S" manufactured by Idemitsu Kosan Co., Ltd.

Silica: "ULTRASIL (registered trademark) VN3" manufactured by Evonik Japan Co., Ltd., BET specific surface area 175 $m^2/g$ Carbon black HAF: "SEAST (registered trademark) 3" manufactured by Tokai Carbon Co., Ltd.

Anti-oxidant: "NOCRAC (registered trademark) AD-F" manufactured by Ouchi Shinko Chemical Industrial Co., Ltd.

Vulcanization accelerator T: "NOCCELER (registered trademark) TT" manufactured by Ouchi Shinko Chemical Industrial Co., Ltd.

(Reinforcing Fabric (Top Fabric, Bottom Fabric))

The top fabric 114 and the bottom fabric 115 used a rubber-attached canvas formed by applying a dipping treatment with an RFL liquid to a plain canvas using a cotton spun yarn, applying a heat treatment to the canvas at 150° C. for 2 minutes, and then applying a friction treatment to the canvas in which the canvas is rubbed with the adhesive rubber composition shown in Table 1.

(Cord)

The cord 131 was obtained by applying an adhesion treatment to a cord of total denier 6,000 obtained by twisting 1000 denier polyethylene terephthalate (PET) fibers in a 2×3 twisted configuration with a primary twist coefficient of 3.0 and secondary twist coefficient of 3.0.

(Passive RFID Tag 117)

The passive RFID tag 117 is a free standing dry inlay in which the IC chip 23 and the antenna 22 are integrated (see FIG. 9), and includes no base 21. The IC chip 23 is an IC chip having a temperature sensor function, that is, the passive RFID tag 117 and the sensor 116 (temperature sensor) are integrated. The antenna 22 is made of a copper stranded wire having a diameter of 0.51 mm (0.18 mm×7 stranded wires), and has TEFLON (registered trademark) particles carried on its surface. The size of the passive RFID tag 117 is 100 mm 10 mm. As shown in FIG. 14, the passive RFID tag 117 is disposed at the center in the width direction of the tension layer 111 so that a long side is along the circumferential direction of the V-belt 101.

(Method for Manufacturing Raw Edge Cogged V-Belt 101 According to Example)

Rubber composition forming the tension layer 111, rubber composition forming the compression layer 112, and rubber composition forming the adhesive rubber layer 118 were individually kneaded with a Banbury mixer according to the blending shown in Table 1, and the obtained kneaded rubber was passed through a calendar roll and rolled to prepare unvulcanized rubber sheets (sheet for a compression rubber layer, sheet for a tension rubber layer, sheet for an adhesive rubber layer). Short fibers were subjected to adhesion treatment with an RFL liquid and had a solid content adhesion rate of 6% by mass. In addition, a sheet-like cog pad was prepared in advance by forming a cog shape on a laminate obtained by laminating a compression rubber layer sheet (unvulcanized rubber) having a predetermined thickness and an inner circumferential reinforcing fabric. Further, a laminate (tension layer sheet) obtained by laminating the sheet for a tension layer (unvulcanized rubber) having a predetermined thickness and the top fabric 114 was produced.

Next, a cylindrical mold including alternate convex portions and concave portions corresponding to the cog shape on the outer circumstance was used to wind the cog pad prepared in advance to fit the cog shape on the outer circumstance, and the sheet for an adhesive rubber layer (unvulcanized rubber) was further wound around the outer circumstance. The cord 131 was then spirally spun around the outer circumstance, the sheet for an adhesive rubber layer (the same as the above-described sheet for an adhesive rubber layer) was further wound around the outer circumstance, and the passive RFID tag 117 integrated with the temperature sensor 116 was attached to a predetermined position of the outer circumferential surface. Then, a molded body was produced by winding the previously produced tension layer sheet around the outer circumstance to cover the passive RFID tag 117.

Thereafter, in a state in which the outer circumstantial side of the belt was covered with a jacket, the mold to which the molded body was attached was set in a vulcanization can, and vulcanization was performed at a temperature of 170° C. for 40 minutes to prepare a vulcanized belt sleeve. The sleeve was cut into a V shape by a cutter to prepare the raw edge cogged V-belt 101 (size: upper width of 22.3 mm, thickness of 11.4 mm, belt circumferential length of 1550 mm) in which the RFID tag was embedded in the tension rubber layer.

(Monitoring of Internal Temperature During Running of Belt)

Figure 15:
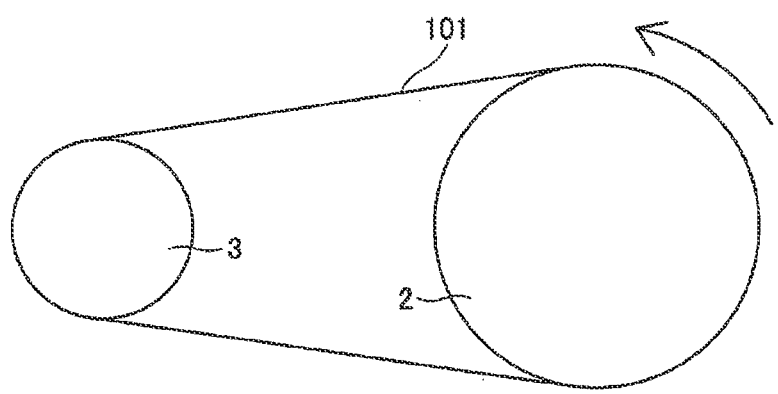
FIG. 15 is a schematic view of a test apparatus used in the example.

A running test was performed using the raw edge cogged V-belt 101 in which the passive RFID tag 117 was embedded to confirm running performance (failure of the RFID tag or the like). A running test apparatus employed a test apparatus in which, as shown in FIG. 15, the raw edge cogged V-belt 101 was stretched between the driving pulley 2 having a diameter of 195 mm and the driven pulley 3 having a diameter of 125 mm.

In the running test, a signal of the internal temperature of the V-belt 101 detected by the IC chip 23 (temperature sensor 116) in the passive RFID tag 117 embedded in the belt was received by a receiver (AR52 manufactured by Nordic ID), and was output to a personal computer to monitor the temperature change.

In the test, the driving pulley 2 was first driven for 48 hours at an axial load of 30 kgf and a rotational speed of 1000 rpm, and it was confirmed that there was no failure in the passive RFID tag 117 and the internal temperature could be measured even after 48 hours. Next, the rotation speed was gradually increased from 1000 rpm, and the V-belt 101 was running under a condition of 4700 rpm after about 2 hours. It was confirmed that even when the rotational speed was 4700 rpm, there was no failure in the passive RFID tag 117 and the temperature could be measured.

Figure 16:
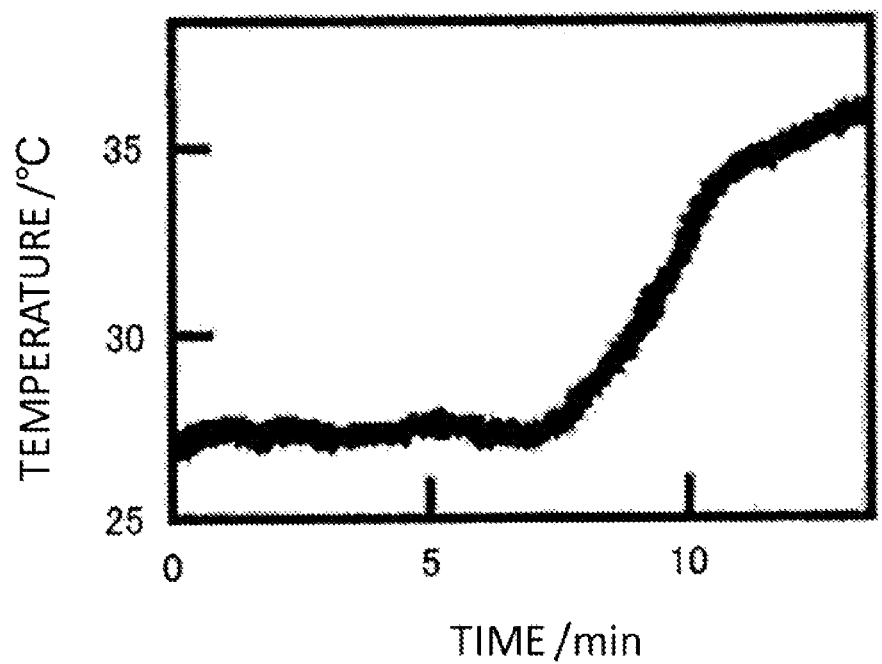
FIG. 16 is a graph showing the internal temperature of the V-belt according to the example that changes with time when the V-belt runs under a predetermined condition.

Next, a test of monitoring a change in the internal temperature of the belt under a low-speed running condition was performed. The V-belt 101 was caused to run at a rotational speed of the driving pulley 2 of 100 rpm, and a change in the internal temperature was tracked. As shown in FIG. 16, data in which the internal temperature of the V-belt 101 rapidly rises 15 minutes after the start of running was obtained. Therefore, it was also confirmed that the state change of the V-belt 101 could be detected.

Although the present invention has been described in detail with reference to the specific embodiments, it is obvious to those skilled in the art that various changes and modifications may be made without departing from the gist and the scope of the present invention.

The present application is based on Japanese Patent Application No. 2019-012409 filed on Jan. 28, 2019 and Japanese Patent Application No. 2020-006930 filed on Jan. 20, 2020.

REFERENCE SIGNS LIST

1 V-belt
2 driving pulley
3 driven pulley
4 reader
10 laminate
11 tension layer
12 compression layer
13 cord layer
131 cord
14 top fabric
15 bottom fabric
16 pressure sensor
161, 162 electrode layer
163 piezoelectric layer
17, 27 passive RFID tag
21 base
22, 32 antenna
23 IC chip
100 system for acquiring V-belt pressure data

The invention claimed is:

1. A belt comprising:
   a laminate comprising a back surface layer disposed on a back surface side and a tension member layer including a tension member;
   a sensor provided in the laminate and configured to detect a state of the belt; and
   a passive RFID also provided in the laminate, comprising an IC chip and an antenna, and configured to transmit state information on the belt detected by the sensor externally,
   wherein the sensor and the passive RFID are directly embedded in and contact the laminate and the sensor is chemically or physically bonded to the laminate,
   the RFID is disposed in the back surface side of the laminate relative to the tension member, and
   the antenna is made of a conductive linear material having PTFE powder carried on a surface thereof.

2. The belt according to claim 1, wherein the tension member is a cord,
   the laminate comprises the back surface layer, an inner surface layer disposed on an inner surface side, and the tension member layer which is a cord layer including the cord embedded between the back surface layer and the inner surface layer, and the belt is a power transmission belt.

3. The belt according to claim 1, wherein the sensor and the RFID are disposed in the same layer of the laminate.

4. The belt according to claim 1, wherein the antenna is made of a conductive linear material having a meander line shape.

5. The belt according to claim 1, wherein the RFID further comprises a connection conductive wire connecting the IC chip and the antenna, the IC chip and the antenna are disposed along a predetermined direction, and the antenna is a dipole antenna made of one conductive linear material and extending from a connection portion connected to the connection conductive wire of the antenna to one side and the other side in a direction orthogonal to the predetermined direction.

6. The belt according to claim 1, wherein the RFID further comprises a base, the IC chip is provided in the base, the RFID is provided in the back surface layer or an inner surface layer of the laminate, and a material of the base is the same as a material of a layer of the laminate in which the RFID is provided.

7. The belt according to claim 1, wherein the RFID is a sensor-integrated RFID provided with the sensor.

8. The belt according to claim 1, wherein the belt comprises a plurality of the sensors and a plurality of the RFIDs, and each of the sensors is connected to at least one of the RFIDs.

9. A system for acquiring belt state information, the system comprising:

a belt comprising a laminate comprising a back surface layer disposed on a back surface side and a tension member layer including a tension member, a sensor provided in the laminate and configured to detect a state of the belt, and a passive RFID also provided in the laminate and configured to transmit state information on the belt detected by the sensor externally, wherein the sensor and the passive RFID are directly embedded in and contact the laminate and the sensor is chemically or physically bonded to the laminate and the RFID comprises an IC chip and an antenna made of a conductive linear material having PTFE powder carried on a surface thereof; and a reader configured to receive a signal from the RFID, wherein the RFID operates by an electromagnetic wave transmitted from the reader and transmits the state information on the belt to the reader, and the RFID is disposed in the back surface side of the laminate relative to the tension member.

10. The system for acquiring belt state information according to claim 9, wherein the tension member is a cord, the laminate comprises the back surface layer, an inner surface layer disposed on an inner surface side, and the tension member layer which is a cord layer including the cord embedded between the back surface layer and the inner surface layer, and the belt is a power transmission belt.

* * * * *